(12) United States Patent
Chang

(10) Patent No.: US 11,714,343 B2
(45) Date of Patent: Aug. 1, 2023

(54) ILLUMINATION SYSTEM AND PROJECTION APPARATUS

(71) Applicant: Coretronic Corporation, Hsin-Chu (TW)

(72) Inventor: Jui Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 213 days.

(21) Appl. No.: 17/159,111

(22) Filed: Jan. 26, 2021

(65) Prior Publication Data

US 2021/0247679 A1 Aug. 12, 2021

(30) Foreign Application Priority Data

Feb. 10, 2020 (CN) .......................... 202010083880.9

(51) Int. Cl.
*G03B 21/20* (2006.01)

(52) U.S. Cl.
CPC ....... *G03B 21/2033* (2013.01); *G03B 21/208* (2013.01); *G03B 21/2066* (2013.01)

(58) Field of Classification Search
None
See application file for complete search history.

(56) References Cited

U.S. PATENT DOCUMENTS

| 2016/0198135 A1* | 7/2016 | Kita ......................... F21V 9/08 348/756 |
|---|---|---|
| 2017/0115554 A1 | 4/2017 | D'Oosterlinck et al. |
| 2017/0271837 A1 | 9/2017 | Hemenway et al. |

FOREIGN PATENT DOCUMENTS

| CN | 1732403 | 2/2006 | |
|---|---|---|---|
| CN | 101833150 | 9/2010 | |
| CN | 202008573 | 10/2011 | |
| CN | 102722075 | 10/2012 | |
| CN | 102904161 | 1/2013 | |
| CN | 103439857 | 12/2013 | |
| CN | 103968268 | 9/2016 | |
| CN | 104460202 | 4/2017 | |
| CN | 108303839 A * | 7/2018 | ........... G02B 26/008 |

(Continued)

OTHER PUBLICATIONS

"Office Action of China Counterpart Application", dated Dec. 27, 2021, p. 1-p. 13.

*Primary Examiner* — Bao-Luan Q Le
*Assistant Examiner* — Danell L Owens
(74) *Attorney, Agent, or Firm* — JCIPRNET

(57) ABSTRACT

An illumination system includes first laser light sources, second laser light sources, an optical module, and a light homogenizing element. The first and second laser light sources respectively provide first and second beams. A light spot area formed when the second beams are emitted is different from that formed when the first beams are emitted. The optical module converts the first beams into spot-expanding beams which form a light spot area different from that of the first beams. The light homogenizing element includes a light incident face disposed on transmission paths of the second beams and the spot-expanding beams. A difference between light spot areas formed by the second beams and the spot-expanding beams on the light incident face is less than a difference between light spot areas formed when the second beams and the first beams are emitted. A projection apparatus having the illumination system is further disclosed.

20 Claims, 8 Drawing Sheets

(56) References Cited

FOREIGN PATENT DOCUMENTS

| | | | |
|---|---|---|---|
| CN | 211698569 | | 10/2020 |
| EP | 1983763 | | 10/2008 |
| EP | 2943719 | | 11/2015 |
| JP | 2009109382 | A * | 5/2009 |
| JP | 2011043703 | | 3/2011 |
| JP | 2016018208 | | 2/2016 |
| KR | 20150123064 | | 11/2015 |
| TW | 201128225 | | 8/2011 |
| TW | 201616210 | | 5/2016 |

* cited by examiner

# ILLUMINATION SYSTEM AND PROJECTION APPARATUS

CROSS-REFERENCE TO RELATED APPLICATION

This application claims the priority benefit of China application serial no. 202010083880.9, filed on Feb. 10, 2020. The entirety of the above-mentioned patent application is hereby incorporated by reference herein and made a part of this specification.

BACKGROUND

Technical Field

The disclosure relates to an optical system and an optical apparatus, and in particular, to an illumination system and a projection apparatus.

Description of Related Art

A projection apparatus is a display device for generating a large-sized picture. With the evolution and innovation of science and technology, the projection apparatus has been continuously improved. An imaging principle of the projection apparatus is to convert an illumination beam generated by an illumination system into an image beam via a light valve, and then project the image beam onto a projection target object (for example, a screen or a wall face) through a projection lens to form a projection picture.

In addition, the illumination system also evolves from an ultra-high-performance lamps (a UHP lamp) and a light-emitting diode (LED) to the currently most advanced laser diode (LD) light source according to the market requirements for brightness, color saturation, service life, non-toxic and environmental protection of the projection apparatus. In the current technological development, a plurality of laser diodes may be concentrated and combined into a multi-chip laser (MCL) light source. Therefore, setting density of the laser light source may be further increased, and the design difficulty may be greatly reduced.

However, for the mainstream market, the volume of the projection apparatus will be an important indicator. Therefore, how to put into a limited volume a laser light source for achieving the required brightness while maintaining the optical performance at a high level is a major design challenge. In addition, there is a phenomenon of disuniform beam intensity between different color light sources.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides an illumination system and a projection apparatus, which may improve the uniformity of beams.

Other objectives and advantages of the invention may be further known from technical features disclosed in the invention.

In order to achieve one or a part or all of the foregoing purposes or other purposes, an embodiment of the invention provides an illumination system, including a plurality of first laser light sources, a plurality of second laser light sources, an optical module, a light homogenizing element. The first laser light source is configured to provide a plurality of first beams. The second laser light source is configured to provide a plurality of second beams. A light spot area which is formed when the second beams are emitted is different from a light spot area which is formed when the first beams are emitted. The optical module is configured on transmission paths of the plurality of first beams to convert the first beams into a plurality of spot-expanding beams, and a light spot area formed by the plurality of spot-expanding beams is different from a light spot area formed by the first beams. The light homogenizing element includes a light incident face disposed on transmission paths of the second beams and the spot-expanding beams, and a difference between light spot areas formed by the second beams and the spot-expanding beams on the light incident face is less than a difference between light spot areas which are formed when the second beams and the first beams are emitted.

In order to achieve one or a part or all of the foregoing objectives, or other objectives, another embodiment of the invention provides a projection apparatus including an illumination system, a light valve module, and a projection lens. The illumination system is configured to provide an illumination beam. The illumination system includes a plurality of first laser light sources, a plurality of second laser light sources, an optical module, and a light homogenizing element. The first laser light source is configured to provide a plurality of first beams. The second laser light source is configured to provide a plurality of second beams. A light spot area which is formed when the second beams are emitted is different from a light spot area which is formed when the first beams are emitted. The optical module is configured on transmission paths of the plurality of first beams to convert the first beams into a plurality of spot-expanding beams, and a light spot area formed by the plurality of spot-expanding beams is different from a light spot area formed by the first beams. The light homogenizing element includes a light incident face disposed on transmission paths of the second beams and the spot-expanding beams, and is configured to convert the second beams and the spot-expanding beams into the illumination beam. The light valve module is disposed on a transmission path of the illumination beam and is configured to convert the illumination beam into an image beam. The projection lens is located on a transmission path of the image beam and is configured to magnify the image beam as a projection beam. A difference between light spot areas formed by the second beams and the spot-expanding beams on the light incident face is less than a difference between light spot areas which are formed when the second beams and the first beams are emitted.

Based on the foregoing, the embodiments of the invention have at least one of the following advantages or effects. In the illumination system and the projection apparatus of the invention, the laser beam provided by the laser light source may undergo expansion of the light spot via the optical module. Therefore, the laser beam of a single light spot may be converted into a spot-expanding beam via the optical module. In this way, the passed blue beam or green beam may be further adjusted to be a spot-expanding beam having the same optical performance as that of the red beam, thereby improving the uniformity of the illumination beam provided by the illumination system.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
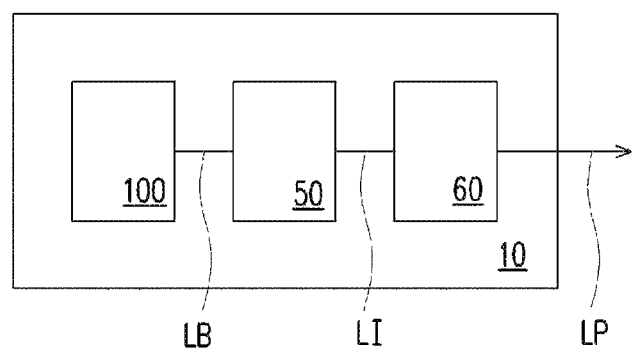
FIG. 1 is a schematic diagram of a projection apparatus according to an embodiment of the invention.

FIG. 1 is a schematic diagram of a projection apparatus according to an embodiment of the invention. Referring to FIG. 1, the present embodiment provides a projection apparatus 10 including an illumination system 100, a light valve module 50, and a projection lens 60. The illumination system 100 is configured to provide an illumination beam LB. The light valve module 50 is disposed on a transmission path of the illumination beam LB, and is configured to convert the illumination beam LB into an image beam LI. The projection lens 60 is located on a transmission path of the image beam LI, and is configured to magnify the image beam LI as a projection beam LP, the projection beam LP being projected to a projection target (not shown), for example, a screen or a wall face.

The light valve module 50 includes at least one light valve and a plurality of different types of optical elements. The light valve is, for example, a reflective light modulator such as a liquid crystal on silicon panel (an LCoS panel) or a digital micro-mirror device (DMD). In some embodiments, the light valve may also be a penetrated optical modulator such as a transparent liquid crystal panel, an electro-optical modulator, a magneto-optic modulator, and an acousto-optic modulator (AOM). The invention does not limit the form and category of the light valve. For detailed steps and implementations of converting the illumination beam LB into the image beam LI by the light valve, adequate instructions, advices, and implementation descriptions may be obtained from general knowledge in the art, and the descriptions thereof are omitted herein. In the present embodiment, there is only one light valve, for example, the projection apparatus 10 with a single digital micro-mirror device is used, but in other embodiments, there may be a plurality of light valves, and the invention is not limited thereto. The optical element is, for example, an optical lens, a reflector, a beam splitter, a prism, or any combination thereof, and is used to guide the illumination beam LB emitted by the illumination system 100 to a light valve, but the invention is not limited thereto.

The projection lens 60 includes, for example, a combination of one or more optical dioptric lenses, for example, includes various combinations of non-planar lenses such as a biconcave lens, a biconvex lens, a meniscus lens, a convex-concave lens, a plano-convex lens, and a plano-concave lens. In one embodiment, the projection lens 60 may further include a flat optical lens, which projects the image beam LI from the light valve module 50 to the projection target in a reflective manner. The invention does not limit a form and a category of the projection lens 60.

Figure 2:
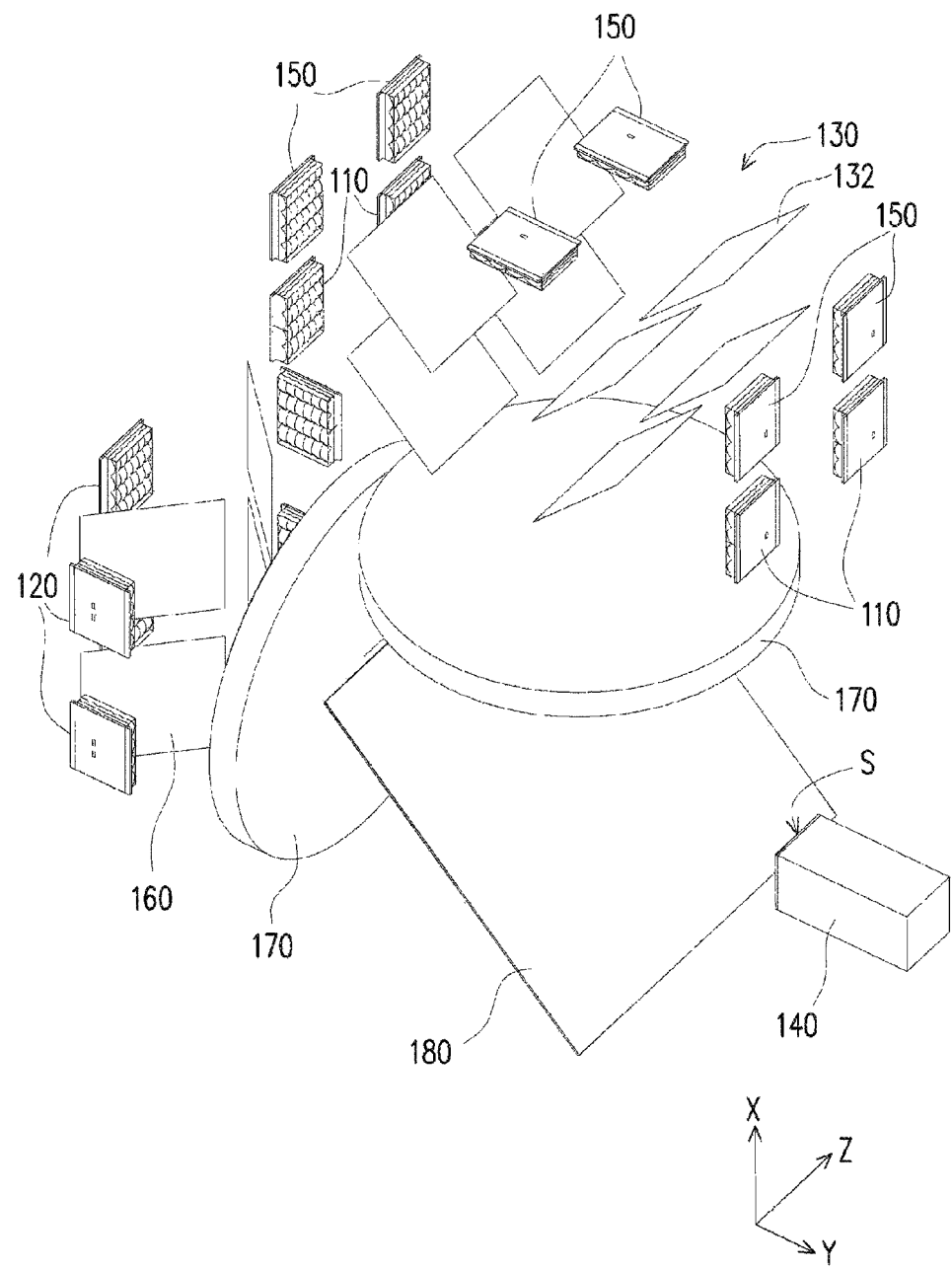
FIG. 2 is a schematic three-dimensional view of an illumination system according to an embodiment of the invention.

FIG. 2 is a schematic three-dimensional view of an illumination system according to an embodiment of the invention. Referring to FIG. 2, an illumination system 100 includes a plurality of first laser light sources 110, a plurality of second laser light sources 120, an optical module 130, and a light homogenizing element 140. Specifically, in the present embodiment, the illumination system 100 further includes a plurality of third laser light sources 150, a plurality of reflectors 160, a plurality of focusing lenses 170, and a beam splitter 180. The plurality of first laser light sources 110 are configured to provide a plurality of first beams (not shown), the plurality of second laser light sources 120 are configured to provide a plurality of second beams (not shown), and the plurality of third laser light sources 150 are configured to provide a plurality of third beams (not shown). In other embodiments, the third laser light source 150 may not be configured, and the invention is not limited thereto.

For example, in the present embodiment, the first laser light source 110 is a blue light-emitting element, for example, a blue laser diode (LD) or a light-emitting module composed of the blue laser diodes, and therefore, the first beam is a blue beam. The second laser light source 120 is a red light-emitting element, for example, a red laser diode or a light-emitting module composed of the red laser diodes, and therefore, the second beam is a red beam. The third laser light source 150 is a green light-emitting element, for example, a green laser diode or a light-emitting module composed of the green laser diodes, and therefore, the third beam is a green beam.

Figure 3:
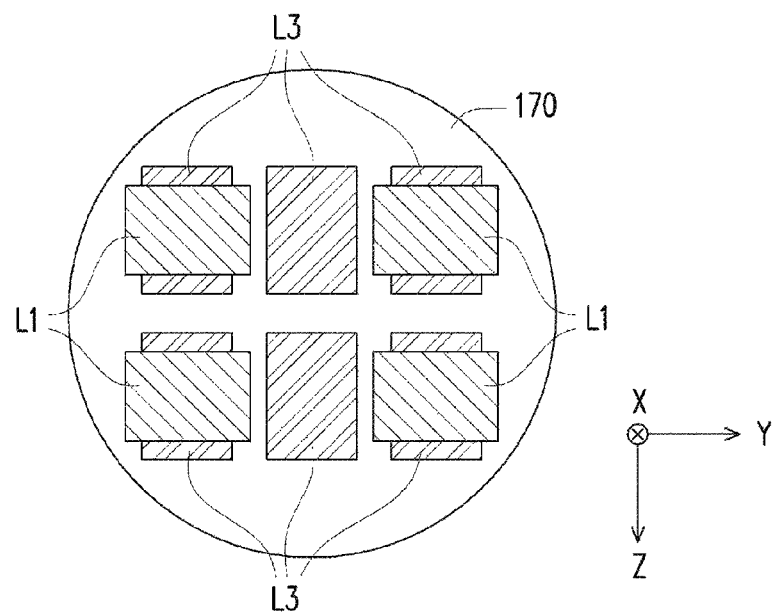
FIG. 3 is a schematic diagram of light spots presented by first beams and third beams on a focusing lens in the illumination system of FIG. 2.

FIG. 3 is a schematic diagram of light spots presented by first beams and third beams on a focusing lens in the illumination system of FIG. 2. Referring to FIG. 2 and FIG. 3 together, in the present embodiment, a blue light-emitting element as a first laser light source 110 and a green light-emitting element as a third laser light source 150 are disposed on a same light-emitting side. Therefore, the quantity and positions of the first laser light sources 110 and the third laser light sources 150 may be configured according to a ratio of blue light to green light required by the illumination system 100. For example, in the present embodiment, the illumination system 100 includes four first laser light sources 110 and six third laser light sources 150, and the configuration method of the first laser light sources 110 and the third laser light sources 150 is shown in FIG. 2. Through the optical action of a reflector or a beam splitter disposed in the optical module 130, the first beams L1 and the third beams L3 emitted by the first laser light sources 110 and the third laser light sources 150 may be uniformly distributed on a focusing lens 170 adjacent to the first laser light sources 110 and the third laser light sources 150, as shown in FIG. 3. In other words, in the present embodiment, the first beam and the third beam have common paths to reach the focusing lens 170.

On the other hand, it should be noted that a light spot area which is formed when the second beams are emitted is different from a light spot area which is formed when the first beams are emitted. For example, in the present embodiment, there are two red laser diodes in a single second laser light source 120. Therefore, a second beam provided by the second laser light source 120 is a beam presenting double light spots. However, in other embodiment, there may be more than two red laser diodes in a single second laser light source 120, and the invention is not limited thereto. In the present embodiment, there is one blue laser diode in a single first laser light source 110. Therefore, a first beam provided by the first laser light source 110 is a beam presenting a single light spot. Specifically, a light spot area (produced by the first beams or the second beams) means that a light beam directly emits to a virtual reference plane producing an area.

Figure 4:
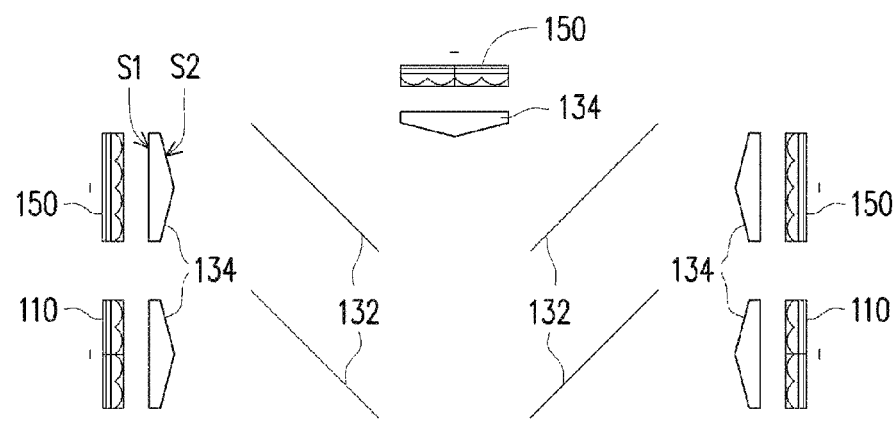
FIG. 4 is a schematic diagram of a part of an illumination system according to an embodiment of the invention.
Figure 4:
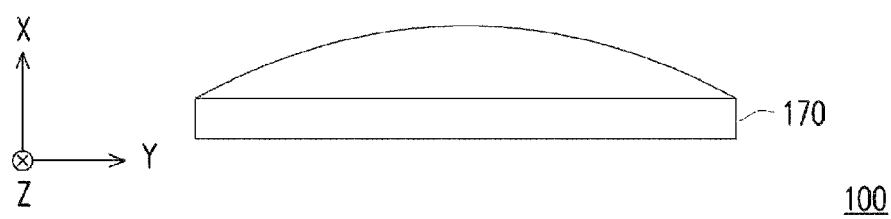

FIG. 4 is a schematic diagram of a part of an illumination system according to an embodiment of the invention. Referring to FIG. 2 and FIG. 4, an optical module 130 is configured on transmission paths of the first beams to convert the first beams into a plurality of spot-expanding beams (not shown), and the third beams transmitted through the optical module 130 also become other spot-expanding beams. A light homogenizing element 140 includes a light incident face S disposed on transmission paths of the second beams and the spot-expanding beams, as shown in FIG. 2. The light homogenizing element 140 is configured to adjust the pattern of light spots of the beams, so that the pattern of light spots of the beams can match a shape (for example, a rectangular shape) of the working area of a light valve, all positions of the light spots have consistent or approximate light intensity, and light intensity of an illumination beam is uniform. In the present embodiment, the light homogenizing element 140 is, for example, an integration rod, but in other embodiments, the light homogenizing element 140 may also be other appropriate type of optical elements, for example, a fly-eye lens array, and the invention is not limited thereto.

Specifically, the optical module 130 includes a plurality of reflective elements 132 and at least one refractive element 134. The reflective elements 132 and the refractive elements 134 are disposed on the transmission paths of the first beams and the third beams, and the refractive element 134 is configured to convert the first beams into spot-expanding beams. The refractive element is, for example, a prism, and the refractive element 134 has a first face S1 and a second face S2 opposite to each other. One of the first face S1 and the second face S2 is a planar surface, and the other is a combination of a plurality of non-parallel planar surfaces. For example, in the present embodiment, the first face S1 of the refractive element 134 is a planar surface, and the second face S2 is a composite inclined plane composed of two planar surfaces. In addition, in the present embodiment, there are a plurality of refractive elements 134 which are disposed between the first laser light sources 110 and the reflective elements 132, respectively. In the present embodiment, the refractive elements 134 are also disposed between the third laser light sources 150 and the reflective elements 132, as shown in FIG. 4. In this way, a single-spot laser beam may be refracted through the second face S2 of the refractive element 134 to form a spot-expanding beam having a plurality of light spots.

Therefore, the plurality of first beams and the plurality of third beams are transmitted through the optical module 130 to form a plurality of spot-expanding beams, then sequentially transmitted through the focusing lens 170 and the beam splitter 180 adjacent to the optical module 130, and finally transmitted to the light homogenizing element 140. The plurality of second beams are sequentially transmitted through a plurality of reflectors 160, through the focusing lens 170 and the beam splitter 180 adjacent to the optical module 160, and finally transmitted to the light homogenizing element 140. Finally, the spot-expanding beams and the second beams are formed into illumination beams via the light homogenizing element 140.

Figure 5A:
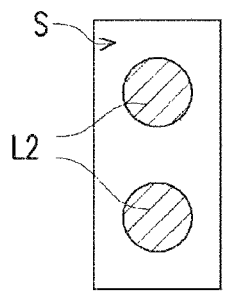
FIG. 5A is a schematic diagram of light spots presented by second beams on a light incident face of a light homogenizing element according to an embodiment of the invention.

FIG. 5A is a schematic diagram of light spots presented by second beams on a light incident face of a light homogenizing element according to an embodiment of the invention.

Figure 5B:
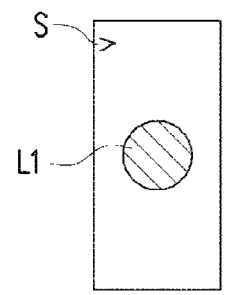
FIG. 5B and FIG. 5C are each a schematic diagram of light spots presented by a first beam on a light incident face of a light homogenizing element before and after passing an optical module according to an embodiment of the invention.
Figure 5C:
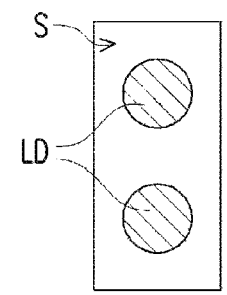

FIG. 5B and FIG. 5C are each a schematic diagram of light spots presented by a first beam on a light incident face of a light homogenizing element before and after passing an optical module according to an embodiment of the invention. Referring to FIG. 2, FIG. 5A to FIG. 5C, it should be noted that, in the present embodiment, a light spot area formed by the spot-expanding beams is different from a light spot area formed by the first beams, and a light spot area formed by the spot-expanding beams is different from a light spot area formed by the third beams. In addition, a difference between the light spot area formed by the second beams and the spot-expanding beams on a light incident face S of the light homogenizing element 140 is less than a difference between light spot areas formed by the second beams and the first beams when emitted, and a time when emitted means that when the beams leave laser light sources. In other words, the light spot area is changed when the first beams are converted into spot-expanding beams and when the third beams are converted into spot-expanding beams. Specifically, in the present embodiment, the pattern of light spots formed by the second beams L2 transmitted to the light incident face S of the light homogenizing element 140 is double light spots, as shown in FIG. 5A. The pattern of light spots formed by the spot-expanding beams transmitted to the light incident face S of the light homogenizing element 140 is also double light spots after passing through the light spot with expanded beams of the optical module 130, as shown in FIG. 5C. In other words, if the first beams are directly transmitted to the light incident face S of the light homogenizing element 140 without being converted by the optical module 130, the pattern of the formed light spot is a single light spot, as shown in FIG. 5B. In addition, in the present embodiment, the slight spot area of the third beams when emitted is substantially the same as a spot area of the first beams when emitted, and therefore, the pattern of the light spots formed by transmitting the spot-expanding beams, into which the third beams are converted, on the light incident face S of the light homogenizing element 140 is also double light spots. In this way, the passed blue beam or green beam may be further adjusted to be a spot-expanding beam having the same optical performance as that of the red beam through the optical module, thereby improving the uniformity of the illumination beam provided by the illumination system.

Figure 6:
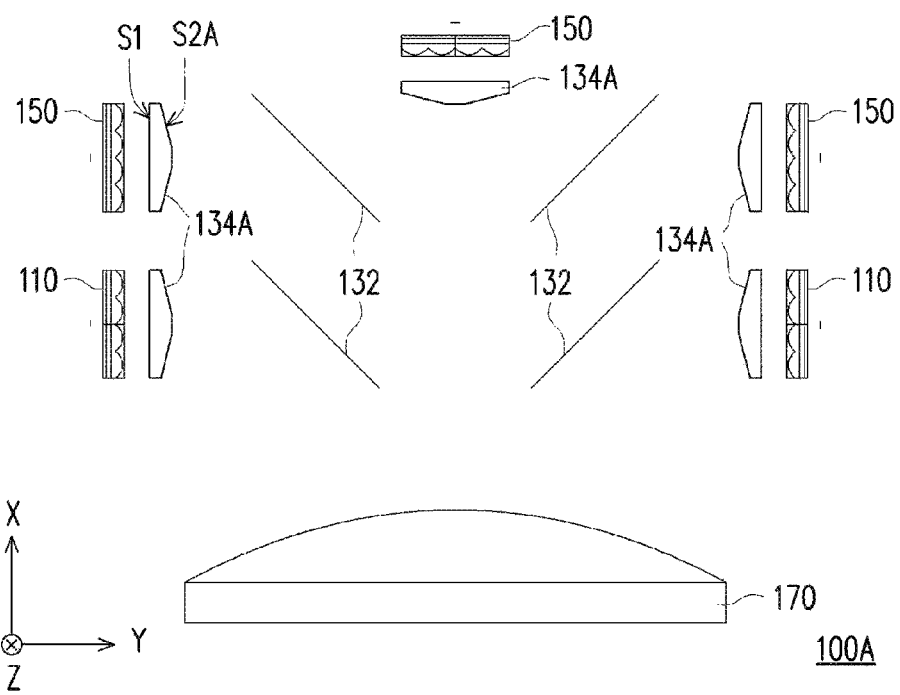
FIG. 6 is a schematic diagram of a part of an illumination system according to another embodiment of the invention.

FIG. 6 is a schematic diagram of a part of an illumination system according to another embodiment of the invention. Referring to FIG. 6, a part of an illumination system 100A shown in the present embodiment is similar to the illumination system 100 shown in FIG. 4. A difference between the two is that, in the present embodiment, a second face S2A in a refractive element 134A of the illumination system 100A is a composite inclined plane composed of three planar surfaces. Therefore, the second face may be further configured in an illumination system in which a second beam provided by a second laser light source has three light spots (that is, there are three red laser diodes). In this way, the first beam and the third beam may refract a beam with three light spots via the second face S2A passing the refractive element 134A, so that the optical performance is adjusted to be the same as that of the red beam, thereby improving the uniformity of the illumination beam provided by the illumination system.

Figure 7:
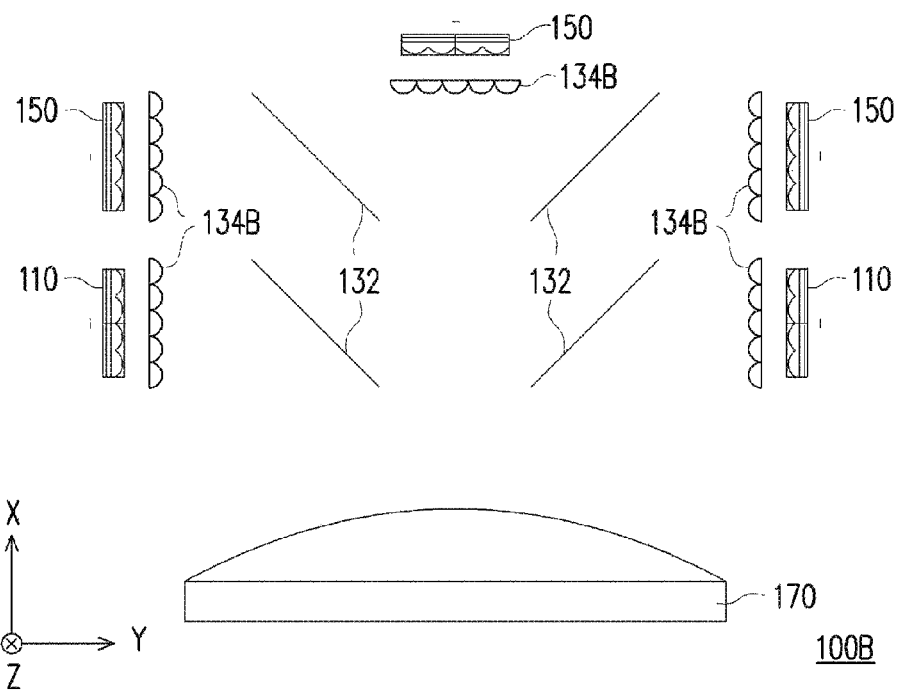
FIG. 7 is a schematic diagram of a part of an illumination system according to another embodiment of the invention.

FIG. 7 is a schematic diagram of a part of an illumination system according to another embodiment of the invention. A part of an illumination system 100B shown in the present embodiment is similar to the illumination system 100 shown in FIG. 4. A difference between the two is that, in the present embodiment, a refractive element 134B of the illumination system 100B is a fly-eye lens. In this way, the first beam and the third beam may generate a spot-expanding beam with light spots expanding through the fly-eye lens, so that the optical performance is adjusted to be the same as that of the red beam, thereby improving the uniformity of the illumination beam provided by the illumination system.

Figure 8:
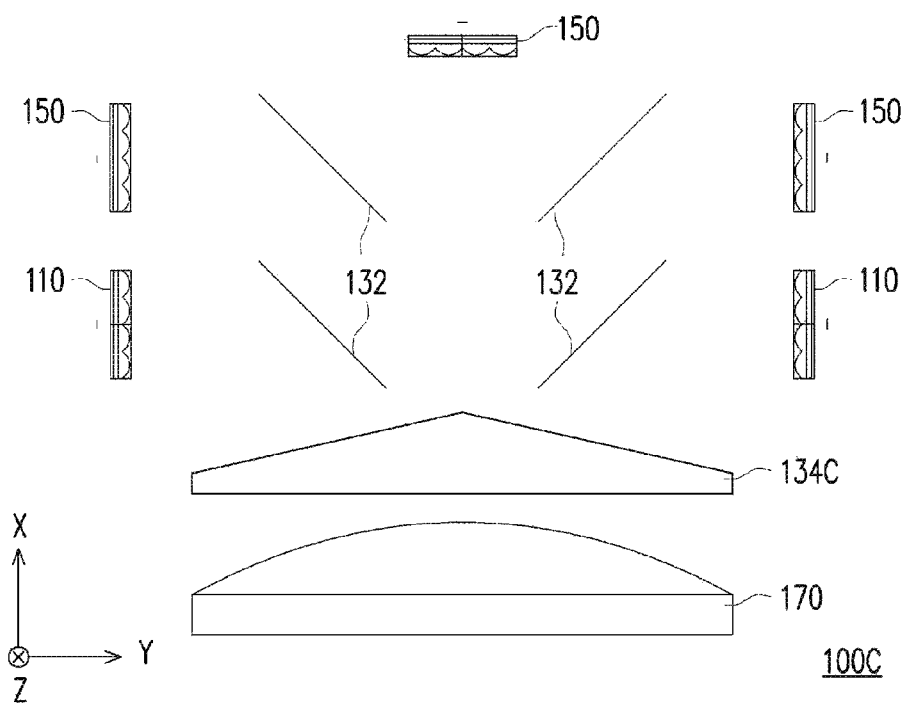
FIG. 8 is a schematic diagram of a part of an illumination system according to another embodiment of the invention.

FIG. 8 is a schematic diagram of a part of an illumination system according to another embodiment of the invention. A part of an illumination system 100C shown in the present embodiment is similar to the illumination system 100 shown in FIG. 4. A difference between the two is that, in the present embodiment, there is a single refractive element 134C, and a reflective element 132 is disposed between a first laser light source 110 and the refractive element 134C and between a third laser light source 150 and the refractive element 134C. In this way, the illumination system may be simplified, and the installation process may also be simplified.

Figure 9:
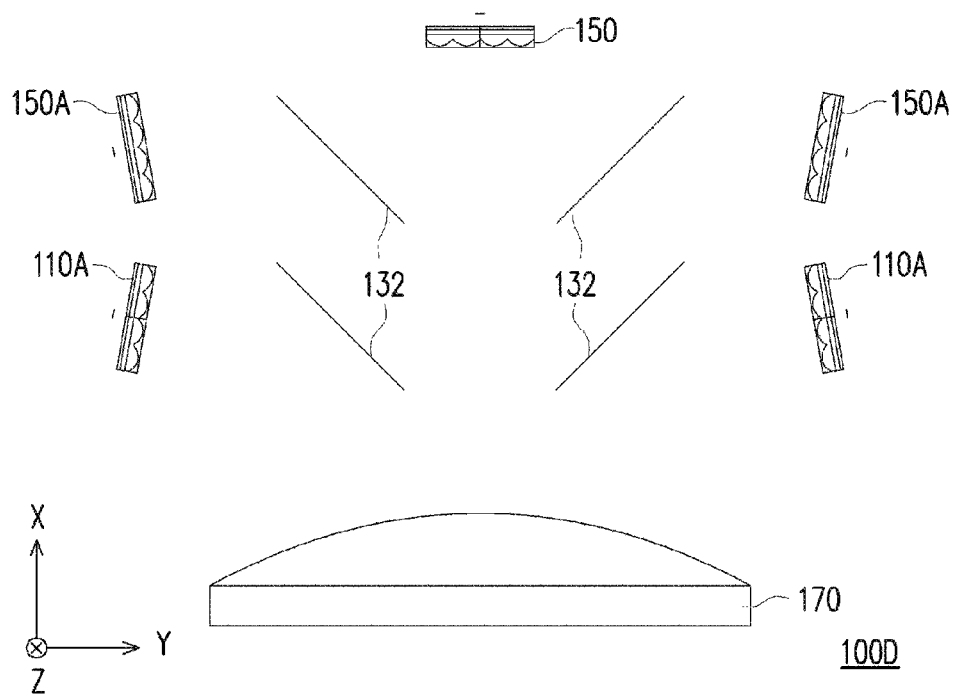
FIG. 9 is a schematic diagram of a part of an illumination system according to another embodiment of the invention.
Figure 10:
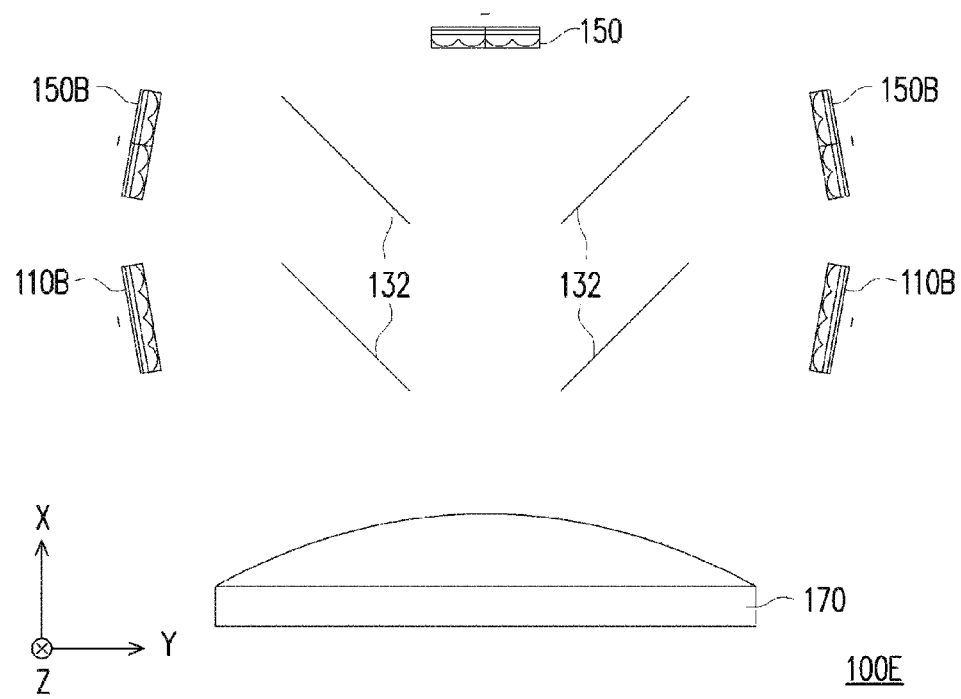
FIG. 10 is a schematic diagram of a part of an illumination system according to another embodiment of the invention.

FIG. 9 is a schematic diagram of a part of an illumination system according to another embodiment of the invention. FIG. 10 is a schematic diagram of a part of an illumination system according to another embodiment of the invention. Referring to FIG. 9 and FIG. 10, a part of an illumination system 100D and an illumination system 100E shown in the embodiments of FIG. 9 and FIG. 10 is similar to the illumination system 100 shown in FIG. 4. A difference is that, in the embodiments of FIG. 9 and FIG. 10, first laser light sources 110A, 110B and third laser light sources 150A, 150B are disposed inclined with each other. For example, in the illumination system 100D of FIG. 9, the first laser light source 110A and the third laser light source 150A are inclined outward and symmetrical with each other, and in the illumination system 100E of FIG. 10, the first laser light source 110B and the third laser light source 150B are inclined inward of each other and are symmetrical to each other. Therefore, the first beam and the third beam may generate a beam with double light spots in an inclined configuration manner, so that the optical performance is adjusted to be the same as that of the red beam, thereby improving the uniformity of an illumination beam provided by the illumination system.

Figure 11:
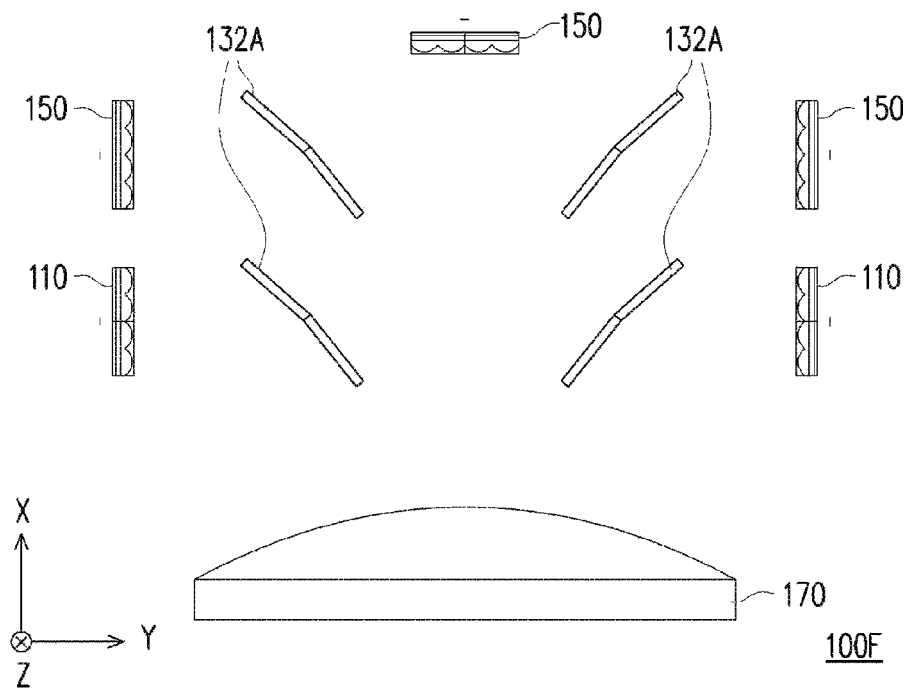
FIG. 11 is a schematic diagram of a part of an illumination system according to another embodiment of the invention.
Figure 12:
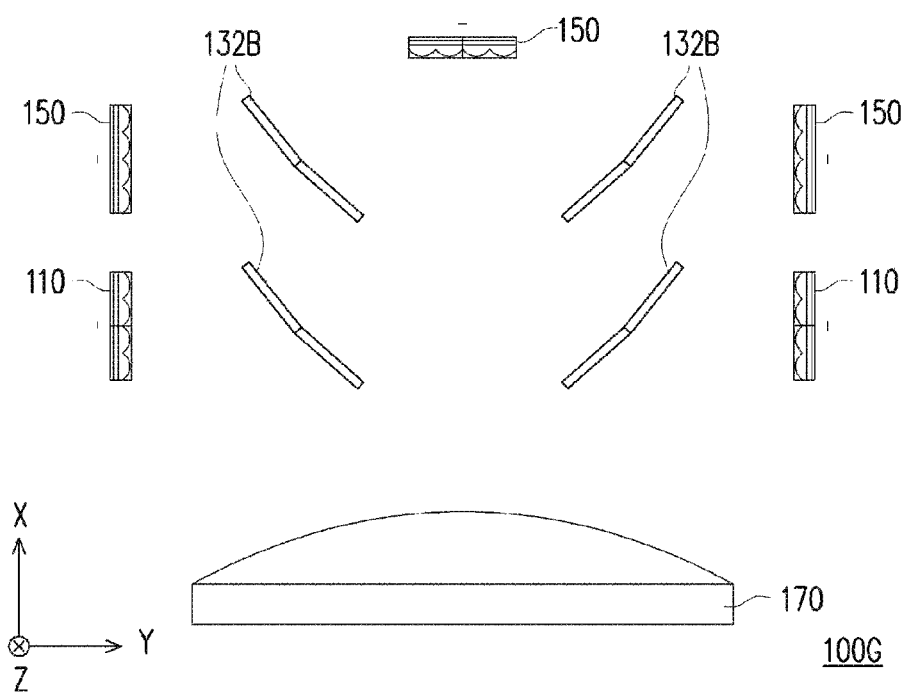
FIG. 12 is a schematic diagram of a part of an illumination system according to another embodiment of the invention.

FIG. 11 is a schematic diagram of a part of an illumination system according to another embodiment of the invention. FIG. 12 is a schematic diagram of a part of an illumination system according to another embodiment of the invention. Referring to FIG. 11 and FIG. 12, a part of an illumination system 100F and an illumination system 100G shown in the embodiments of FIG. 11 and FIG. 12 is similar to the illumination system 100 shown in FIG. 4. A difference is that in the embodiments of FIG. 11 and FIG. 12, reflective elements in each of the reflective elements 132A, 132B include a plurality of reflective portions which are not parallel to each other. For example, in the illumination system 100F of FIG. 11, adjacent reflective elements 132A include reflective portions which are bent toward each other toward a direction in which a beam enters, and in the illumination system 100G of FIG. 12, adjacent reflective elements 132B include reflective portions which are bent toward each other away from the direction in which a beam enters. In this way, the first beam and the third beam may generate a spot-expanding beam with light spots expanding through the reflective portions with different inclination degrees, so that the optical performance is adjusted to be the same as that of the red beam, thereby improving the uniformity of the illumination beam provided by the illumination system.

Based on the above, the embodiments of the invention have at least one of the following advantages or effects. In the illumination system and the projection apparatus of the invention, the laser beam provided by the laser light source may undergo expansion of the light spot via the optical module. Therefore, the laser beam of a single light spot may be converted into a spot-expanding beam via the optical module. In this way, the passed blue beam or green beam may be further adjusted to be a spot-expanding beam having the same optical performance as that of the red beam, thereby improving the uniformity of the illumination beam provided by the illumination system.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. Moreover, these claims may refer to use "first", "second", etc. following with noun or element. Such terms should be understood as a nomenclature and should not be construed as giving the limitation on the number of the elements modified by such nomenclature unless specific number has been given. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system comprising a plurality of first laser light sources, a plurality of second laser light sources, an optical module, and a light homogenizing element, wherein the plurality of first laser light sources are configured to provide a plurality of first beams, the plurality of second laser light sources are configured to provide a plurality of second beams, wherein a light spot area which is formed when the plurality of second beams are emitted is different from a light spot area which is formed when the plurality of first beams are emitted, the optical module is configured on transmission paths of the plurality of first beams to convert the plurality of first beams into a plurality of spot-expanding beams, wherein a light spot area formed by the plurality of spot-expanding beams is different from a light spot area formed by the plurality of first beams, and the light homogenizing element comprises a light incident face disposed on transmission paths of the plurality of second beams and the plurality of spot-expanding beams, wherein a number of light spots formed by the plurality of first beams is less than a number of light spots formed by the plurality of second beams, a number of light spots formed by the plurality of spot-expanding beams is the same as the number of the light spots formed by the plurality of second beams, and a difference between light spot areas formed by the plurality of second beams and the plurality of spot-expanding beams on the light incident face is less than a difference between light spot areas which are formed when the plurality of second beams and the plurality of first beams are emitted.

2. The illumination system according to claim 1, wherein there are a plurality of light spots formed when the plurality of second beams are emitted.

3. The illumination system according to claim 1, wherein the plurality of first laser light sources are blue lasers, and the plurality of second laser light sources are red lasers.

4. The illumination system according to claim 3, further comprising:

a plurality of third laser light sources configured to provide a plurality of third beams, wherein the plurality of third laser light sources are green laser light sources, and the plurality of first beams and the plurality of third beams have common paths.

5. An illumination system comprising a plurality of first laser light sources, a plurality of second laser light sources, an optical module, and a light homogenizing element, wherein the plurality of first laser light sources are configured to provide a plurality of first beams, the plurality of second laser light sources are configured to provide a plurality of second beams, wherein a light spot area which is formed when the plurality of second beams are emitted is different from a light spot area which is formed when the plurality of first beams are emitted, the optical module is configured on transmission paths of the plurality of first beams to convert the plurality of first beams into a plurality of spot-expanding beams, wherein a light spot area formed by the plurality of spot-expanding beams is different from a light spot area formed by the plurality of first beams, and the light homogenizing element comprises a light incident face disposed on transmission paths of the plurality of second beams and the plurality of spot-expanding beams, wherein a difference between light spot areas formed by the plurality of second beams and the plurality of spot-expanding beams on the light incident face is less than a difference between light spot areas which are formed when the plurality of second beams and the plurality of first beams are emitted, wherein the optical module comprises a plurality of reflective elements disposed on transmission paths of the plurality of first beams and configured to convert the plurality of first beams into the plurality of spot-expanding beams, wherein each of the reflective elements comprises a plurality of reflective portions which are not parallel to each other.

6. An illumination system comprising a plurality of first laser light sources, a plurality of second laser light sources, an optical module, and a light homogenizing element, wherein the plurality of first laser light sources are configured to provide a plurality of first beams, the plurality of second laser light sources are configured to provide a plurality of second beams, wherein a light spot area which is formed when the plurality of second beams are emitted is different from a light spot area which is formed when the plurality of first beams are emitted, the optical module is configured on transmission paths of the plurality of first beams to convert the plurality of first beams into a plurality of spot-expanding beams, wherein a light spot area formed by the plurality of spot-expanding beams is different from a light spot area formed by the plurality of first beams, and the light homogenizing element comprises a light incident face disposed on transmission paths of the plurality of second beams and the plurality of spot-expanding beams, wherein a difference between light spot areas formed by the plurality of second beams and the plurality of spot-expanding beams on the light incident face is less than a difference between light spot areas which are formed when the plurality of second beams and the plurality of first beams are emitted, wherein the optical module comprises a plurality of reflective elements and at least one refractive element, wherein the plurality of reflective elements and the at least one refractive element are disposed on transmission paths of the plurality of first beams, and the at least one refractive element is configured to convert the plurality of first beams into the plurality of spot-expanding beams.

7. The illumination system according to claim 6, wherein the at least one refractive element is a plurality of refractive elements which are respectively disposed between the plurality of first laser light sources and the plurality of reflective elements.

8. The illumination system according to claim 6, wherein the at least one refractive element is one refractive element, and the plurality of reflective elements are disposed between the plurality of first laser light sources and the refractive element.

9. The illumination system according to claim 6, wherein the at least one refractive element is a prism, and the at least one refractive element comprises a first face and a second face opposite to each other, wherein one of the first face and the second face is a planar surface, and the other is a combination of a plurality of non-parallel planar surfaces.

10. The illumination system according to claim 6, wherein the at least one refractive element is a fly-eye lens.

11. A projection apparatus comprising an illumination system, a light valve module, and a projection lens, wherein the illumination system is configured to provide an illumination beam and comprises a plurality of first laser light sources, a plurality of second laser light sources, an optical module, and a light homogenizing element, wherein the plurality of first laser light sources are configured to provide a plurality of first beams, the plurality of second laser light sources are configured to provide a plurality of second beams, wherein a light spot area which is formed when the plurality of second beams are emitted is different from a light spot area which is formed when the plurality of first beams are emitted, the optical module is configured on transmission paths of the plurality of first beams to convert the plurality of first beams into a plurality of spot-expanding beams, wherein a light spot area formed by the plurality of spot-expanding beams is different from a light spot area formed by the plurality of first beams; and the light homogenizing element comprises a light incident face disposed on transmission paths of the plurality of second beams and the plurality of spot-expanding beams, and is configured to convert the plurality of second beams and the plurality of spot-expanding beams into the illumination beam;

the light valve module is disposed on a transmission path of the illumination beam and is configured to convert the illumination beam into an image beam, and the projection lens is located on a transmission path of the image beam and is configured to magnify the image beam as a projection beam, wherein a number of light spots formed by the plurality of first beams is less than a number of light spots formed by the plurality of second beams, and a number of light spots formed by the plurality of spot-expanding beams is the same as the number of the light spots formed by the plurality of second beams, and a difference between light spot areas formed by the plurality of second beams and the plurality of spot-expanding beams on the light incident face is less than a difference between light spot areas which are formed when the plurality of second beams and the plurality of first beams are emitted.

12. The projection apparatus according to claim 11, wherein there are a plurality of light spots formed when the plurality of second beams are emitted.

13. The projection apparatus according to claim 11, wherein the plurality of first laser light sources are blue lasers, and the plurality of second laser light sources are red lasers.

14. The projection apparatus according to claim 13, wherein the illumination system further comprises a plurality of third laser light sources configured to provide a plurality of third beams, wherein the plurality of third laser light sources are green laser light sources, and the plurality of first beams and the plurality of third beams have common paths.

15. A projection apparatus comprising an illumination system, a light valve module, and a projection lens, wherein the illumination system is configured to provide an illumination beam and comprises a plurality of first laser light sources, a plurality of second laser light sources, an optical module, and a light homogenizing element, wherein the plurality of first laser light sources are configured to provide a plurality of first beams, the plurality of second laser light sources are configured to provide a plurality of second beams, wherein a light spot area which is formed when the plurality of second beams are emitted is different from a light spot area which is formed when the plurality of first beams are emitted, the optical module is configured on transmission paths of the plurality of first beams to convert the plurality of first beams into a plurality of spot-expanding beams, wherein a light spot area formed by the plurality of spot-expanding beams is different from a light spot area formed by the plurality of first beams; and the light homogenizing element comprises a light incident face disposed on transmission paths of the plurality of second beams and the plurality of spot-expanding beams, and is configured to convert the plurality of second beams and the plurality of spot-expanding beams into the illumination beam;

the light valve module is disposed on a transmission path of the illumination beam and is configured to convert the illumination beam into an image beam, and the projection lens is located on a transmission path of the image beam and is configured to magnify the image beam as a projection beam, wherein a difference between light spot areas formed by the plurality of second beams and the plurality of spot-expanding beams on the light incident face is less than a difference between light spot areas which are formed when the plurality of second beams and the plurality of first beams are emitted, wherein the optical module comprises a plurality of reflective elements disposed on transmission paths of the plurality of first beams and configured to convert the plurality of first beams into the plurality of spot-expanding beams, wherein each of the reflective elements comprises a plurality of reflective portions which are not parallel to each other.

16. A projection apparatus comprising an illumination system, a light valve module, and a projection lens, wherein
the illumination system is configured to provide an illumination beam and comprises a plurality of first laser light sources, a plurality of second laser light sources, an optical module, and a light homogenizing element, wherein the plurality of first laser light sources are configured to provide a plurality of first beams, the plurality of second laser light sources are configured to provide a plurality of second beams, wherein a light spot area which is formed when the plurality of second beams are emitted is different from a light spot area which is formed when the plurality of first beams are emitted, the optical module is configured on transmission paths of the plurality of first beams to convert the plurality of first beams into a plurality of spot-expanding beams, wherein a light spot area formed by the plurality of spot-expanding beams is different from a light spot area formed by the plurality of first beams; and the light homogenizing element comprises a light incident face disposed on transmission paths of the plurality of second beams and the plurality of spot-expanding beams, and is configured to convert the plurality of second beams and the plurality of spot-expanding beams into the illumination beam;

the light valve module is disposed on a transmission path of the illumination beam and is configured to convert the illumination beam into an image beam, and the projection lens is located on a transmission path of the image beam and is configured to magnify the image beam as a projection beam, wherein a difference between light spot areas formed by the plurality of second beams and the plurality of spot-expanding beams on the light incident face is less than a difference between light spot areas which are formed when the plurality of second beams and the plurality of first beams are emitted, wherein the optical module comprises a plurality of reflective elements and at least one refractive element, wherein the plurality of reflective elements and the at least one refractive element are disposed on transmission paths of the plurality of first beams, and the at least one refractive element is configured to convert the plurality of first beams into the plurality of spot-expanding beams.

17. The projection apparatus according to claim 16, wherein the at least one refractive element is a plurality of refractive elements which are respectively disposed between the plurality of first laser light sources and the plurality of reflective elements.

18. The projection apparatus according to claim 16, wherein the at least one refractive element is one refractive element, and the plurality of reflective elements are disposed between the plurality of first laser light sources and the refractive element.

19. The projection apparatus according to claim 16, wherein the at least one refractive element is a prism, and the at least one refractive element comprises a first face and a second face opposite to each other, wherein one of the first face and the second face is a planar surface, and the other is a combination of a plurality of non-parallel planar surfaces.

20. The projection apparatus according to claim 16, wherein the at least one refractive element is a fly-eye lens.

* * * * *